United States Patent
Barfurth et al.

(10) Patent No.: US 6,780,955 B2
(45) Date of Patent: Aug. 24, 2004

(54) MIXTURE OF CATENATE AND CYCLIC SILOXANE OLIGOMERS, ITS PREPARATION AND USE

(75) Inventors: Dieter Barfurth, Rheinfelden (DE); Helmut Mack, Rheinfelden (DE)

(73) Assignee: Degussa AG, Dusseldorf (DE)

(*) Notice: Subject to any disclaimer, the term of this patent is extended or adjusted under 35 U.S.C. 154(b) by 0 days.

(21) Appl. No.: 10/348,959

(22) Filed: Jan. 23, 2003

(65) Prior Publication Data
US 2003/0166817 A1 Sep. 4, 2003

(30) Foreign Application Priority Data

Jan. 23, 2002 (DE) .......................................... 102 02 389
Aug. 30, 2002 (DE) .......................................... 102 40 754

(51) Int. Cl.[7] .............................................. C08G 77/08
(52) U.S. Cl. ............................. 528/12; 528/20; 528/32; 528/489; 528/495; 556/460; 525/474
(58) Field of Search ............................... 528/20, 12, 32, 528/489, 495; 556/460; 525/474

(56) References Cited

U.S. PATENT DOCUMENTS

| | | | |
|---|---|---|---|
| 3,260,699 A | 7/1966 | Schmidt | |
| 4,609,752 A | 9/1986 | Giesing et al. | |
| 4,749,764 A | 6/1988 | Koerner et al. | |
| 5,252,767 A | 10/1993 | Maass et al. | |
| 5,282,998 A | * 2/1994 | Horn et al. | 252/182.14 |
| 5,808,125 A | 9/1998 | Standke et al. | |
| 5,849,942 A | 12/1998 | Standke et al. | |
| 5,863,509 A | 1/1999 | Standke et al. | |
| 6,054,601 A | 4/2000 | Standke et al. | |
| 6,100,418 A | 8/2000 | Standke et al. | |
| 6,107,505 A | 8/2000 | Yoshida et al. | |
| 6,133,466 A | 10/2000 | Edelmann et al. | |
| 6,177,584 B1 | 1/2001 | Loewenberg et al. | |
| 6,228,936 B1 | 5/2001 | Standke et al. | |
| 6,239,194 B1 | 5/2001 | Standke et al. | |
| 6,251,989 B1 | 6/2001 | Edelmann et al. | |
| 6,255,513 B1 | 7/2001 | Standke et al. | |
| 6,288,256 B1 | 9/2001 | Standke et al. | |
| 6,361,871 B1 | 3/2002 | Jenkner et al. | |
| 6,395,858 B1 | 5/2002 | Mack et al. | |
| 6,403,228 B1 | 6/2002 | Mack et al. | |
| 6,444,315 B1 | 9/2002 | Barfurth et al. | |
| 6,500,883 B1 | 12/2002 | Mack et al. | |
| 6,528,585 B1 | 3/2003 | Standke et al. | |
| 6,534,667 B1 | 3/2003 | Standke et al. | |
| 2002/0086907 A1 | * 7/2002 | Standke et al. | 516/9 |

FOREIGN PATENT DOCUMENTS

| | | |
|---|---|---|
| EP | 0 495 676 | 7/1992 |
| EP | 0 518 057 | 12/1992 |
| EP | 1 205 505 | 5/2002 |

OTHER PUBLICATIONS

R. Nagel, et al., Journal of Organic Chemistry, vol. XVI, Part 2, pp. 1768–1771, "Studies in Silico–Organic Compounds. XVIII. The Preparation and Properties of Vinyltrialkoxysilanes", 1951.

* cited by examiner

Primary Examiner—Kuo-Liang Peng
(74) Attorney, Agent, or Firm—Oblon, Spivak, McClelland, Maier & Neustadt, P.C.

(57) ABSTRACT

The present invention provides a process for preparing a mixture, which mixture includes catenate and cyclic siloxanes of formula I $$R_3Si\text{—}O\text{—}(SiR_2\text{—}O\text{—})_m SiR_3 \qquad (I)$$

and cyclic siloxanes of formula II

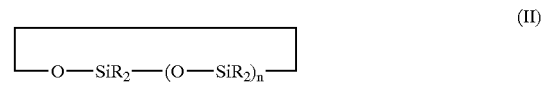

(II)

wherein m is an integer from 0 to 40 and n is an integer from 2 to 40, wherein $R_2$ and $R_3$ are each independently an organic functional group selected from the group including alkyl, aryl, vinyl, and alkoxy groups, and wherein there is not more than one vinyl group or aryl group per silicon atom, said process including a controlled hydrolysis, condensation or cocondensation reaction of at least one monomeric silane in alcoholic solution in the presence of an acidic catalyst, which reaction includes contacting alcohol, water, and at least one chlorosilane component selected from the group including (i), (ii), (iii):

(i) at least one arylchlorosilane;

(ii) at least one admixture selected from the group including alkylchlorosilane and arylchlorosilane, arylchlorosilane and vinylchlorosilane, alkylchlorosilane and vinylchlorosilane, and arylchlorosilane and vinylchlorosilane and alkylchlorosilane;

(iii) at least one selected from the group including chlorosilane, alkylchlorosilane, arylchlorosilane, and vinylchlorosilane in two or more separate batches to obtain two or more separate mixtures and thereafter combining the mixtures;

to form the mixture of the catenate and cyclic siloxanes. The present invention also provides the mixtures and the use of such mixtures.

16 Claims, No Drawings

MIXTURE OF CATENATE AND CYCLIC SILOXANE OLIGOMERS, ITS PREPARATION AND USE

BACKGROUND OF THE INVENTION

1. Field of the Invention

The present invention relates to mixtures of catenate alkoxysiloxanes of the general formula $R_3SiO-(SiR_2-O)_mSiR_3$ and also cyclic alkoxysiloxanes of the general formula

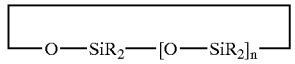

said alkoxysiloxanes also being referred to below for short as siloxanes or siloxane oligomers, a process for preparing said mixtures and to their use.

2. Discussion of the Background

Organofunctional/vinyl-functional alkoxysiloxanes are used, for example, as crosslinkers for thermoplastic polyolefins. The performance requirements imposed on such products are nowadays very high and there is a pressing need for specially tailored solutions.

It is known that a 1,3 divinyltetramethoxydisiloxane contaminated with higher polymers can be obtained during the distillative workup of crude vinyltrimethoxysilane as obtained in the reaction of vinyltrichlorosilane and methanol (Nagel et al., Journal of Organic Chemistry, Volume XVI (1951), Part 2, 1768–1771).

EP 0 518 057 A1 discloses a process for preparing such mixtures of catenate and cyclic siloxane oligomers. In that process, corresponding organoalkoxysilanes with different substituents are subjected to controlled hydrolysis, condensation or cocondensation with addition of HCl catalyst and a defined amount of water, the catalyst and the free alcohol being removed from the product mixture following the reaction. Where alkoxysilanes with different organic functional groups are used, the desired aim is to obtain a distribution of the different substituents in the resultant siloxane oligomers which is very uniform, i.e., random. The aim in this case is for a molar ratio of vinyl to alkoxy substituents of from 1:1 to 1:8 and a molar ratio of vinyl to alkyl substituents of from 1:0 to 1:8, with not more than one vinyl substituent occurring in the siloxane per silicon atom.

Moreover, EP 1 205 505 A2 discloses a continuous process for preparing a mixture of catenate and cyclic organoalkoxysiloxanes starting from corresponding organochlorosilanes.

All of this is difficult to control, since hydrolyzable organosilanes which carry different organic functional groups are known to possess markedly different hydrolysis and condensation behaviors. Furthermore, organoalkoxysilanes are expensive raw materials.

SUMMARY OF THE INVENTION

One object of the present invention to provide a process for preparing organofunctional alkoxysiloxane mixtures, especially vinyl-functional or alkyl/vinyl-functional and/or corresponding aryl-functional alkoxysiloxanes.

This and other objects have been achieved by the present invention, the first embodiment of which provides a process for preparing a mixture, which mixture includes catenate and cyclic siloxanes of formula I $$R_3Si-O-(SiR_2-O-)_mSiR_3 \quad (I)$$

and cyclic siloxanes of formula II

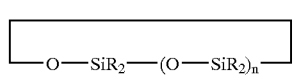

wherein m is an integer from 0 to 40 and n is an integer from 2 to 40, wherein $R_2$ and $R_3$ are each independently an organic functional group selected from the group including alkyl, aryl, vinyl, and alkoxy groups, and wherein there is not more than one vinyl group or aryl group per silicon atom, said process including a controlled hydrolysis, condensation or cocondensation reaction of at least one monomeric silane in alcoholic solution in the presence of an acidic catalyst, which reaction includes contacting alcohol, water, and at least one chlorosilane component selected from the group including (i), (ii), (iii):

(i) at least one arylchlorosilane;

(ii) at least one admixture selected from the group including alkylchlorosilane and arylchlorosilane, arylchlorosilane and vinylchlorosilane, alkylchlorosilane and vinylchlorosilane, and arylchlorosilane and vinylchlorosilane and alkylchlorosilane;

(iii) at least one selected from the group including chlorosilane, alkylchlorosilane, arylchlorosilane, and vinylchlorosilane in two or more separate batches to obtain two or more separate mixtures and thereafter combining the mixtures;

to form the mixture of the catenate and cyclic siloxanes.

Another embodiment of the invention provides a mixture, prepared according the above process.

Another embodiment of the invention provides an alkyl-functional, vinyl-functional, aryl-functional, alkyl/vinyl-functional, alkyl/aryl-functional, aryl/vinyl-functional and/or alkyl/aryl/vinyl-functional alkoxysiloxane mixture or blend thereof, prepared according to the above process.

DESCRIPTION OF THE PREFERRED EMBODIMENTS

A more complete appreciation of the invention and many of the attendant advantages thereof will be readily obtained as the same becomes better understood by reference to the following detailed description, which is not intended to be limiting unless otherwise specified.

Surprisingly it has been found that mixtures of catenate and cyclic siloxanes and siloxane oligomers, especially vinyl-functional, aryl-functional, alkyl/vinyl-functional, aryl/vinyl-functional, alkyl/aryl-functional, and vinyl/alkyl/aryl-functional alkoxysiloxane mixtures, or corresponding blends of at least two of the aforementioned organofunctional alkoxysiloxane mixtures, can be prepared in a particularly simple and economic manner from the chlorosilanes by controlled addition of water and alcohol, in particular without the addition of an additional catalyst, and that, moreover, it is also possible, particularly by deliberate mixing of organofunctional alkoxysiloxane mixtures obtained in this way, to prepare blends having specially tailored performance properties. Also of particular advantage is the reaction, which is an essentially one-stage reaction. The hydrolysis, esterification, and condensation or cocondensation of the chlorosilanes to give the desired siloxane oligomer mixture take place generally in situ. Chlorosilanes are much less expensive than their alkoxysilane counterparts. Moreover, there is no need to add a catalyst. Consequently, the present process is simple and, overall, is particularly economic.

One preferred embodiment of the present invention provides a process for preparing a mixture of catenate siloxanes of the general formula I

  (I)

and cyclic siloxanes of the general formula II

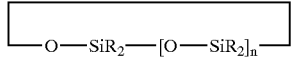  (II)

in which formulae m is an integer from 0 to 40, preferably from 1 to 20, with particular preference from 3 to 6, and n is an integer from 2 to 40, preferably from 2 to 20, the $R^2$ and $R^3$ groups are identical or different and are each independently an organic functional group selected from alkyl, aryl, vinyl, and alkoxy groups, which are each individually and independently preferably a linear, branched or cyclic alkyl group having from 1 to 18 carbon atoms, vinyl, aryl having from 6 to 18 carbon atoms, preferably phenyl, tolyl or benzyl, and alkoxy, preferably methoxy or ethoxy, and there is not more than one vinyl group or one aryl group per silicon atom, which is obtained by controlled hydrolysis, condensation or cocondensation of at least one monomeric silane in alcoholic solution in the presence of an acidic catalyst using (i) at least one arylchlorosilane or (ii) a mixture of at least chlorosilanes selected from alkylchlorosilane and arylchlorosilane, arylchlorosilane and vinylchlorosilane, alkylchlorosilane and vinylchlorosilane, arylchlorosilane and vinylchlorosilane and alkylchlorosilane, or (iii) at least one chlorosilane in two or more separate batches, carrying out reaction with addition of alcohol and water, i.e., controlled hydrolysis and condensation, and in the case of (iii) combining at least two of the respective mixtures obtained to form a blend. The controlled blending of individual mixtures in accordance with (iii) takes place appropriately with stirring, it being possible for the respective organoalkoxysiloxanes to undergo equilibration to give polyfunctional organosiloxanes.

Suitably, the vinyl group for the $R_2$ and $R_3$ groups may be a linear, branched or cyclic vinyl groups having from 3 to 18 carbon atoms.

Suitably, the alkoxy group for the $R_2$ and $R_3$ groups may be a linear, branched or cyclic alkoxy group having from 1 to 18 carbon atoms.

Each of the above-mentioned ranges includes all values and subranges therebetween including as appropriate, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 and 40.

In the process of the invention preference is given as the chlorosilane component, in particular in accordance with (iii), to tetrachlorosilane, vinyltrichlorosilane, vinylmethyldichlorosilane, alkyltrichlorosilane, such as methyltrichlorosilane, ethyltrichlorosilane, n-propyltrichlorosilane, i-propyltrichlorosilane, i-butyltrichlorosilane, n-octyltrichlorosilane, i-octyltrichlorosilane, hexadecyltrichlorosilane, octadecyltrichlorosilane, alkylmethyldichlorosilanes, such as dimethyldichlorosilane and methylpropyldichlorosilane, cycloalkyltrichlorosilane and cycloalkylmethyldichlorosilane, such as cyclohexyltrichlorosilane, cyclohexylmethyldichlorosilane, phenylmethyldichlorosilane and phenyltrichlorosilane, or mixtures thereof.

As the alcohol use is made in the process of the invention preferably of methanol, ethanol, n-propanol, i-propanol, 2-methoxyethanol or a mixture thereof.

The process of the invention is preferably conducted using from 0.5 to 1.5 mol of water, preferably from 0.6 to 1.0 mol of water, with particular preference from 0.7 to 0.9 mol of water, per mole of chlorosilane. These ranges include all values and subranges therebetween, including 0.55, 0.65, 0.75, 0.85, 0.95, 0.99, 1.1, 1.2, 1.3, 1.4, 1.45 and 1.49 moles water per mole of chlorosilane. If desired, the alcohol and the amount of water preferred for the hydrolysis and condensation or cocondensation can be used in the form of a water/alcohol mixture. In that case the chlorosilane is introduced first and the water/alcohol mixture is metered in.

In the process of the invention, from 1 to 1.5 mol of alcohol, more preferably from 1.1 to 1.3 mol of alcohol, are preferably used per mole of chlorine in the chlorosilane. These ranges include all values and subranges therebetween, including 1.1, 1.2, 1.3, 1.4, 1.45 and 1.49 moles alcohol per mole chlorine. The combining of the components and the carrying out of the reaction are normally effected with thorough commixing.

In the process of the invention, the reaction is preferably conducted at a temperature in the range from 20 to 100° C., preferably at from 50 to 80° C., under atmospheric pressure. These ranges include all values and subranges therebetween, including 22, 25, 30, 35, 40, 45, 50, 55, 60, 65, 70, 75, 80, 85, 90, 95 and 99° C.

The reaction of the chlorosilanes in accordance with the invention is generally over after from 10 minutes to 5 hours, preferably after from 60 minutes to 2 hours. These ranges include all values and subranges therebetween, including 15, 20, 25, 30, 35, 40, 45, 50, and 55 minutes, 1, 1.1, 1.3, 1.5, 1.7, 1.9, 2.1, 2.3, 2.5, 2.7, 2.9, 3, 3.1, 3.3, 3.5, 3.7, 3.9, 4, 4.1, 4.3, 4.5, 4.7, and 4.9 hours.

If desired, the water and/or alcohol is/are suitably metered into the reaction over a period ranging from 10 minutes to 5 hours, and preferably from 60 minutes to 2 hours. These ranges include all values and subranges therebetween, including 15, 20, 25, 30, 35, 40, 45, 50, and 55 minutes, 1, 1.1, 1.3, 1.5, 1.7, 1.9, 2.1, 2.3, 2.5, 2.7, 2.9, 3, 3.1, 3.3, 3.5, 3.7, 3.9, 4, 4.1, 4.3, 4.5, 4.7, and 4.9 hours.

Thereafter it is appropriate to remove free alcohol and the hydrogen chloride formed in the reaction from the product mixture. The removal of the alcohol and hydrogen chloride from the product mixture takes place preferably by distillation under reduced pressure.

The process of the invention can be operated continuously or batchwise.

Generally speaking, the process of the invention is carried out by introducing the chlorosilane into a stirred tank, heating it where appropriate, and metering in the water in the form of a water/alcohol mixture, e.g., a water/methanol mixture. Hydrogen chloride is eliminated, escapes from the reaction vessel, and is absorbed in water. Following the end of the evolution of hydrogen chloride, stirring is generally continued for a while and then distillative removal of excess quantities of alcohol is commenced. For complete conversion of the chloro groups on the silicon atoms, the resultant product can be neutralized with a solution of a sodium alkoxide in alcohol, e.g., a 30% strength solution of sodium methoxide in methanol. Accordingly, corresponding organofunctional alkoxysiloxane mixtures are obtainable as product by the process of the invention.

A further possibility is to measure out defined amounts of mixtures, prepared as described above but separately from one another, and to combine them in an appropriate way with thorough commixing.

Alkoxysiloxane mixtures obtained in accordance with the invention preferably comprise polyfunctional organoalkoxysiloxanes, with such siloxanes of the mixture or of the blend, in accordance with formula I or II, carrying not only at least one alkoxy group but at least one further organic functional group, preferably two further organic functional groups, where appropriate three further organic functional groups, selected from alkyl, vinyl, and aryl. Accordingly, alkoxysiloxane mixtures or blends of this kind may comprise, for example, aryl-functional catenate alkoxysiloxanes and cyclic alkoxysiloxanes or alkyl/aryl-functional catenate alkoxysiloxanes and cyclic alkoxysiloxanes, or aryl/vinyl-functional catenate alkoxysiloxanes and cyclic alkoxysiloxanes, or catenate and cyclic alkyl/aryl/vinyl-functional alkoxysiloxanes.

The present invention therefore also provides alkyl-functional, vinyl-functional, aryl-functional, alkyl/vinyl-functional, alkyl/aryl-functional, aryl/vinyl-functional and/or alkyl/aryl/vinyl-functional alkoxysiloxane mixtures or blends thereof obtainable by the process of the invention.

The process of the invention advantageously provides a product, i.e., a mixture or blend of catenate and also cyclic siloxanes with multiple organic functionalities, which are of high purity, with a low level of byproducts, of low volatility, of high flash point, and of low viscosity.

Inventive mixtures of catenate and cyclic siloxanes and/or siloxane oligomers, and also blends prepared deliberate therefrom, can be put to advantageous use for treating an inorganic surface, for water repellent, corrosion preventing or adhesion promoting treatment of metal or alloys, such as iron, steel, aluminum, ceramic, artificial stone, glass, building materials and constructions or components, made for example of concrete, aerated concrete, sandstone, including lime sandstone, or brick, for the coating of glass fibers and mineral fibers, as a binder, as an additive to binders, for silanizing fillers, flame retardants, and pigments, examples being natural, precipitated or pyrogenic silica, silicates, alumina, aluminum hydroxide, titanium oxide, iron oxides, magnesium oxide, gypsum, lime, dolomite, ammonium meta, ortho, pyro, and poly-phosphates, corresponding melamine phosphates, such as melamine pyrophosphate, for improving the rheological properties of dispersions, as adhesion promoters, as water scavengers for adhesives and sealants, especially those based on silicone, on silane-terminated polyethers, also called MS polymers, and on silane-terminated polyurethanes, as water scavengers in polymer compounds, such as vinylsilane-grafted polyolefin, and as release agents, as crosslinkers, for alkoxy-functional silicones, for example, and as an additive to paints and varnishes.

The components of the inventive mixture are also suitably useful as crosslinkers for thermoplastic polyolefins.

EXAMPLES

Having generally described this invention, a further understanding can be obtained by reference to certain specific examples, which are provided herein for purposes of illustration only, and are not intended to be limiting unless otherwise specified.

Example 1
Preparing a Vinyl and Methoxy-functional Oligosiloxane

A 2000 ml jacketed three-necked flask equipped with water condenser, stirrer, thermometer and dropping funnel was charged under nitrogen with 807.5 g (5.0 mol) of vinyltrichlorosilane. Via the dropping funnel, whose inlet tube ends below the surface of the chlorosilane liquid, first of all 240.0 g of methanol (7.5 mol, corresponding to a third of the amount to be added) were metered in at room temperature over the course of 1 or 2 hours. The reaction mixture immediately gave off hydrogen chloride, which was taken off via the condenser and absorbed in water in a receiver vessel. The temperature of the reaction mixture climbed to about 30 to 35° C.

In the next stage, a methanol/water mixture composed of 480.0 g of methanol (15.0 mol, ⅔ of the amount to be added) and 72.0 g of water (4.0 mol) was metered in at a rate such that the temperature of the reaction mixture reached about 75 to 80° C. within 3 or 4 hours. Following the addition of the methanol/water mixture, the contents of the flask were heated at reflux for 60 minutes. The course of the reaction was monitored by means of GC, by determining the vinyltrichlorosilane content.

From the crude product obtained by the above procedure, which contained excess methanol and residues of hydrogen chloride, a methanol/hydrogen chloride mixture was then separated off by distillation under atmospheric pressure. The temperature of the batch climbed to 150 to 155° C. After the reaction mixture had been cooled to about 100° C., the acidity of the product or chloride content was measured. Based on the chloride figure obtained, a stoichiometric amount of sodium methoxide (as a 30% strength methanolic solution) was added and the mixture was stirred for 15 minutes. Then the chloride content was measured again and, where appropriate, further methanolic sodium methoxide was added, followed by further stirring for 15 minutes. If the chloride content was less than 10 mg/kg, the product was cooled to room temperature and the residual methanol was removed by vacuum distillation (to 30 hPa and 100° C. product temperature).

At a final workstep, the sodium chloride formed on neutralization with sodium methoxide was removed from the product on a filter.

This gave 532.5 g (95.8% of theory) of vinyl and methoxy-functional oligosiloxane with the following characteristics:

| | |
|---|---|
| $SiO_2$ content: | 53.9% (by mass) |
| Methanol: | <0.1% (by mass) |
| Color number: | 5 mg Pt-Co/l |

Example 2
Preparing a Vinyl and Ethoxy-functional Oligosiloxane

A 2000 ml jacketed three-necked flask equipped with water condenser, stirrer, thermometer and dropping funnel was charged under nitrogen with 807.5 g (5.0 mol) of vinyltrichlorosilane. Via the dropping funnel, whose inlet tube ends below the surface of the chlorosilane liquid, first of all 575.0 g of ethanol (12.5 mol, corresponding to 60% of the amount to be added) were metered in at room temperature over the course of 2 or 3 hours. The reaction mixture immediately gave off hydrogen chloride, which was taken off via the condenser and absorbed in water in a receiver vessel. The temperature of the reaction mixture climbed to about 35 to 40° C.

In the next stage, an ethanol/water mixture composed of 391.0 g of ethanol (8.5 mol, 40% of the amount to be added) and 72.0 g of water (4.0 mol) was metered in at a rate such that the temperature of the reaction mixture reached about 90 to 95° C. within 3 or 4 hours. Following the addition of the ethanol/water mixture, the contents of the flask were heated at reflux for 60 minutes. The course of the reaction was monitored by means of GC, by determining the vinyltrichlorosilane content.

Workup of the reaction mixture as described in detail in example 1, by distillation and subsequent neutralization with alcoholic sodium alkoxide solution (in this case ethanolic sodium ethoxide solution) gave 619.3 g (94.7% of theory) of vinyl and ethoxy-functional oligosiloxane having the following characteristics:

| | |
|---|---|
| $SiO_2$ content: | 45.2% (by mass) |
| Ethanol: | <0.1% (by mass) |
| Color number: | <5 mg Pt-Co/l |

Example 3

Preparing a Vinyl, Propyl, and Ethoxy-functional Oligosiloxane

A 2000 ml jacketed three-necked flask equipped with water condenser, stirrer, thermometer and dropping funnel was charged under nitrogen with 403.8 g (2.5 mol) of vinyltrichlorosilane and 421.6 g (2.375 mol) of propyltrichlorosilane, and the silanes were mixed. Via the dropping funnel, whose inlet tube ends below the surface of the chlorosilane liquid, first of all 575.0 g of ethanol (12.5 mol, corresponding to 60% of the amount to be added) were metered in at room temperature over the course of 2 or 3 hours. The reaction mixture immediately gave off hydrogen chloride, which was taken off via the condenser and absorbed in water in a receiver vessel. The temperature of the reaction mixture climbed to about 35 to 40° C.

In the next stage, an ethanol/water mixture composed of 402.5 g of ethanol (8.75 mol, 40% of the amount to be added) and 70.2 g of water (3.9 mol) was metered in at a rate such that the temperature of the reaction mixture reached about 90 to 95° C. within 3 or 4 hours. Following the addition of the ethanol/water mixture, the contents of the flask were heated at reflux for 60 minutes. The course of the reaction was monitored by means of GC, by determining the vinyltrichlorosilane content.

Workup of the reaction mixture as described in detail in example 1, by distillation and subsequent neutralization with alcoholic sodium alkoxide solution (in this case ethanolic sodium ethoxide solution) gave 641.2 g (94.9% of theory) of vinyl, propyl, and ethoxy-functional oligosiloxane having the following characteristics:

| | |
|---|---|
| $SiO_2$ content: | 41.1% (by mass) |
| Ethanol: | <0.1% (by mass) |
| Color number: | 5 mg Pt-Co/l |

Example 4

Preparing a Vinyl and Methoxy-functional Oligosiloxane

A 2000 ml jacketed three-necked flask equipped with water condenser, stirrer, thermometer and dropping funnel was charged under nitrogen with 242.3 g (1.5 mol) of vinyltrichlorosilane and 765.0 g (4.5 mol) of tetrachlorosilane, and the silanes were mixed. Via the dropping funnel, whose inlet tube ends below the surface of the chlorosilane liquid, first of all 576.0 g of methanol (18.0 mol, corresponding to ⅔ of the amount to be added) were metered in at room temperature over the course of 1 or 2 hours. The reaction mixture immediately gave off hydrogen chloride, which was taken off via the condenser and absorbed in water in a receiver vessel. The temperature of the reaction mixture climbed to about 30 to 35° C.

In the next stage, a methanol/water mixture composed of 288.0 g of methanol (9.0 mol, ⅓ of the amount to be added) and 86.4 g of water (4.8 mol) was metered in at a rate such that the temperature of the reaction mixture reached about 75 to 80° C. within 3 or 4 hours. Following the addition of the methanol/water mixture, the contents of the flask were heated at reflux for 60 minutes. The course of the reaction was monitored by means of GC, by determining the vinyltrichlorosilane content.

Workup of the reaction mixture as described in detail in example 1, by distillation and subsequent neutralization with alcoholic sodium alkoxide solution (in this case methanolic sodium methoxide solution) gave 664.0 g (96.9% of theory) of vinyl and methoxy-functional oligosiloxane having the following characteristics:

| | |
|---|---|
| $SiO_2$ content: | 52.9% (by mass) |
| Methanol: | <0.1% (by mass) |
| Color number: | <5 mg Pt-Co/l |

Example 5

Preparation of a Vinyl, Methoxy, and Ethoxy-functional Oligosiloxane

In a 2000 ml jacketed three-necked glass flask equipped with water condenser, stirrer and thermometer, 720 g of the vinyl and methoxy-functional oligosiloxane obtained in accordance with example 1 were mixed with 585 g of the vinyl and ethoxy-functional oligosiloxane obtained in accordance with example 2, by heating at 60° C. with stirring.

The resultant oligomer mixture is distinguished by a gradated reactivity with respect, for example, to the surfaces of fillers. Depending on the nature of these surfaces, the desired silanization can be effected by mixing the oligosiloxanes of the invention in accordance with the method described herein.

| | |
|---|---|
| $SiO_2$ content: | 50.0% (by mass) |
| Methanol: | <0.1% (by mass) |
| Ethanol: | <0.1% (by mass) |
| Color number: | <5 mg Pt-Co/l. |

This application is based on German patent applications DE 102 02 389.1, filed Jan. 23, 2002, and DE 102 40 754.1, filed Aug. 30, 2002, the entire contents of each of which are hereby incorporated by referenced, the same as set forth at length.

Obviously, numerous modifications and variations of the present invention are possible in light of the above teachings. It is therefore to be understood that within the scope of the appended claims, the invention may be practiced otherwise than as specifically described herein.

What is claimed is:

1. A process for preparing a mixture, said mixture comprising catenate siloxanes of formula I

 (I)

and cyclic siloxanes of the general formula II

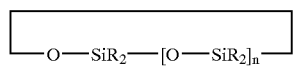 (II)

wherein m is an integer from 0 to 40 and n is an integer from 2 to 40, wherein $R_2$ and $R_3$ are each independently an organic functional group selected from the group consisting of alkyl, aryl, vinyl, and alkoxy groups, and wherein there is not more than one vinyl group or aryl group per silicon atom, said process comprising a controlled hydrolysis, condensation or cocondensation reaction of at least one monomeric silane in alcoholic solution in the presence of an acidic catalyst, which reaction comprises contacting alcohol, water, and at least one chlorosilane component selected from the group consisting of (i), (ii), (iii):

(i) at least one arylchlorosilane;

(ii) at least one admixture selected from the group consisting of alkylchlorosilane and arylchlorosilane, arylchlorosilane and vinylchlorosilane, alkylchlorosilane and vinylchlorosilane, and arylchlorosilane and vinylchlorosilane and alkylchlorosilane;

(iii) at least one selected from the group consisting of chlorosilane, alkylchlorosilane, arylchlorosilane, and vinylchlorosilane in two or more separate batches to obtain two or more separate mixtures and thereafter combining said mixtures;

to form said mixture of said catenate and cyclic siloxanes of formulas I and II, further comprising contacting the mixture with a solution comprising at least one sodium alkoxide and at least one alcohol.

2. The process as claimed in claim 1, wherein said chlorosilane, alkylchlorosilane, arylchlorosilane, and vinylchlorosilane in (i), (ii), and (iii) are selected from the group consisting of tetrachlorosilane, vinyltrichlorosilane, vinylmethyldichlorosilane, alkyltrichlorosilane, alkylmethyldichlorosilanes, phenylmethyldichlorosilane, phenyltrichlorosilane, cycloalkyltrichlorosilane, cycloalkylmethyldichlorosilane, and mixtures thereof.

3. The process as claimed in claim 1, wherein the alcohol is selected from the group consisting of methanol, ethanol, n-propanol, i-propanol, 2-methoxyethanol and mixtures thereof.

4. The process as claimed in claim 1, wherein from 0.5 to 1.5 mol of water are used per mole of chlorosilane component.

5. The process as claimed in claim 1, wherein from 1 to 1.5 mol of alcohol are used per mole of chlorine in the chlorosilane component.

6. The process as claimed in claim 1, wherein the reaction is conducted at a temperature in the range from 20 to 100°C.

7. The process as claimed in claim 1, wherein said mixture of said catenate and siloxanes of formulas I and II further comprises free alcohol and hydrogen chloride formed in said reaction, and said process further comprises removing said free alcohol and said hydrogen chloride.

8. The process as claimed in claim 1, wherein said process is carried out continuously or batchwise.

9. The process as claimed in claim 1, wherein m is an integer ranging from 1 to 20.

10. The process as claimed in claim 1, wherein n is an integer ranging from 2 to 20.

11. The process as claimed in claim 1, wherein at least one of $R_2$ and $R_3$ is an alkyl group selected from the group consisting of linear, branched or cyclic alkyl groups having from 1 to 18 carbon atoms.

12. The process as claimed in claim 1, wherein at least one of $R_2$ and $R_3$ is an aryl group having from 6 to 18 carbon atoms.

13. The process as claimed in claim 1, wherein at least one of $R_2$ and $R_3$ is a vinyl group selected from the group consisting of linear, branched or cyclic vinyl groups having from 3 to 18 carbon atoms.

14. The process as claimed in claim 1, wherein at least one of $R_2$ and $R_3$ is a linear, branched or cyclic alkoxy group having from 1 to 18 carbon atoms.

15. The process as claimed in claim 1, wherein at least one of $R_2$ and $R_3$ is selected from the group consisting of phenyl, tolyl, benzyl, methoxy, ethoxy groups.

16. The process as claimed in claim 1, further comprising using said mixture in at least one process or composition selected from the group consisting of treating an inorganic surface; making metal, alloy, ceramic, artificial stone, glass, building material, and construction water repellent; preventing corrosion in metal, alloy, ceramic, artificial stone, glass, building material, and construction; promoting adhesion in metal, alloy, ceramic, artificial stone, glass, building material, and construction; coating glass fiber; coating mineral fiber; a binder; an additive to binder; silanizing filler, flame retardant and/or pigment; a filler; a flame retardant; a pigment; improving rheological properties of dispersion; an adhesion promoter; a water scavenger for adhesive and sealant; an adhesive; a sealant; a water scavenger in polymer compounds; a release agent; a crosslinker; an additive for paint and/or varnishes; and combinations thereof.

* * * * *